Figure 5:
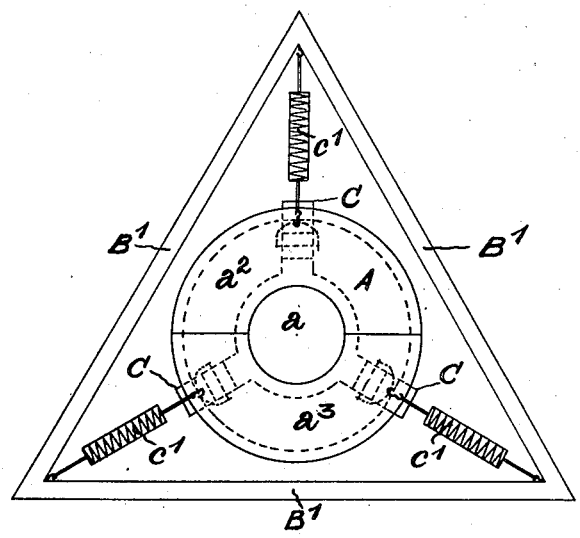

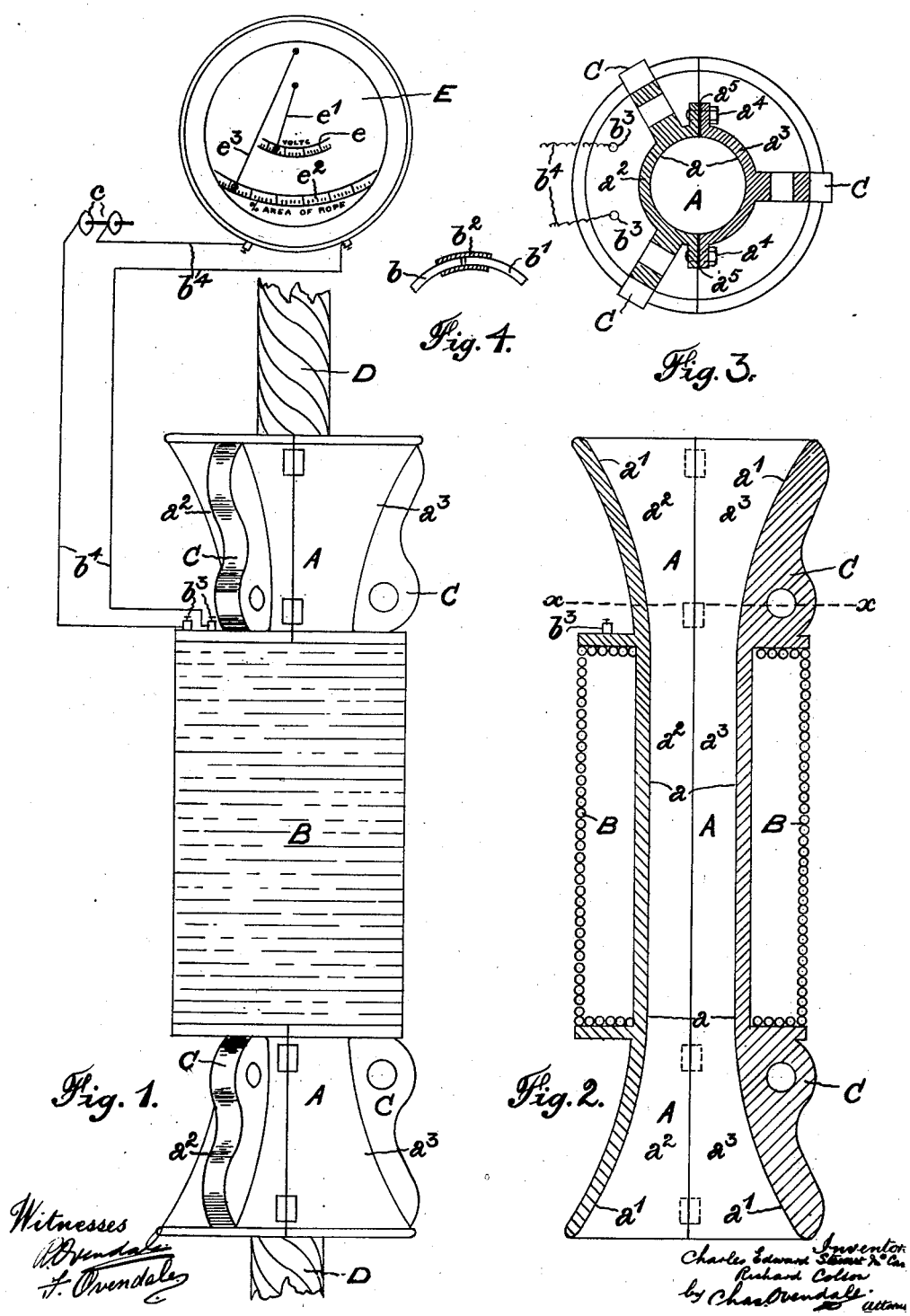

No. 890,085. PATENTED JUNE 9, 1908.
C. E. S. McCANN & R. COLSON.
MEANS FOR TESTING WIRES OR WIRE ROPES.
APPLICATION FILED JAN. 10, 1906.

4 SHEETS—SHEET 3.

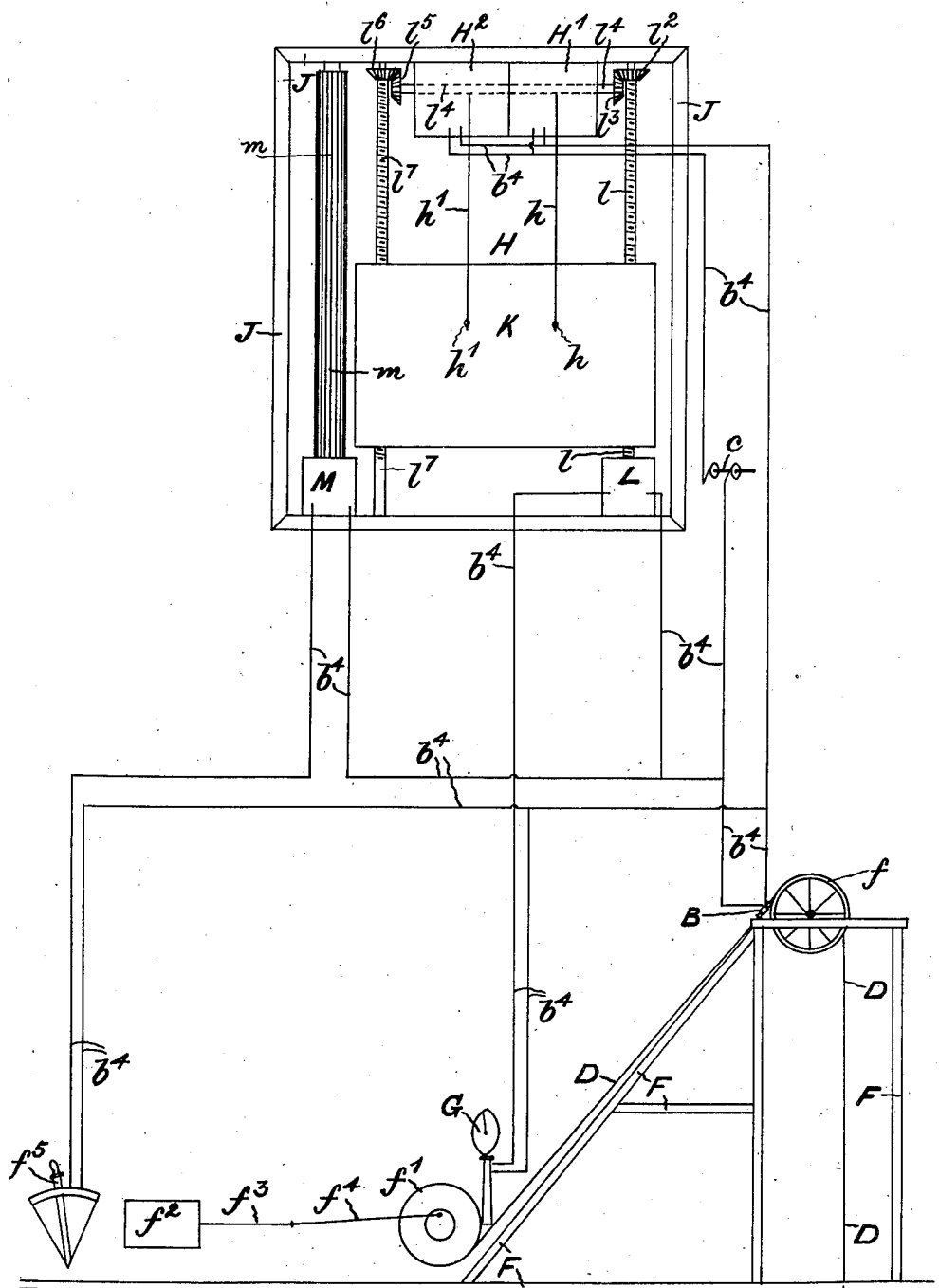

UNITED STATES PATENT OFFICE.

CHARLES EDWARD STUART McCANN, OF JOHANNESBURG, AND RICHARD COLSON, OF BELFAST, TRANSVAAL.

MEANS FOR TESTING WIRES OR WIRE ROPES.

No. 890,085.      Specification of Letters Patent.      Patented June 9, 1908.

Application filed January 10, 1906. Serial No. 295,354.

*To all whom it may concern:*

Be it known that we, CHARLES EDWARD STUART McCANN, of Johannesburg, Transvaal, and RICHARD COLSON, of Belfast, Transvaal, subjects of the King of Great Britain, have invented certain new and useful Improvements in Means for Testing Wires or Wire Ropes, of which the following is a specification.

This invention relates to means for testing wires, wire ropes, rods or bars of metal, or for indicating variations in the cross-sectional area of wires or wire ropes, or rods or bars of metal, owing to faults in the manufacture of the same, to deterioration during use, or from other causes.

The invention is designed more especially for testing the wire ropes or cables employed in mine hoisting and hauling apparatus, in which a considerable decrease in the cross-sectional area usually takes place before breakage. In order to detect this reduction in the cross-sectional area of the rope and the consequent weakening of the same it is now necessary to force open the lay of the rope in order to inspect it. This is extremely undesirable for the reason that the wires of the rope are liable to be broken and elongated (causing a further reduction in the cross-sectional area) and the rope distorted, in the operation.

Now the object of this invention is to provide an instrument by means of which the absolute cross sectional area of the rope in detail and throughout its entire length is indicated, or recorded, or indicated and recorded.

The invention consists essentially in the employment of an electro-magnetic coil through the hollow center of which is passed the wire rope to be tested. Through this coil is passed the electric current, which may be derived from any convenient source and be either an interrupted or an alternating current. In the circuit is interposed a device or instrument which serves for indicating, or for recording, or for indicating and recording, any variations of the electric current passing through the coil, which variations are caused by any variations in the cross sectional area of the wire rope or the like, by means of electro-magnetic induction.

The improvements further relate to details in the construction of the testing coil; to means for supporting or suspending the testing coil; to the means whereby a permanent record of the condition of the rope or cable is obtained, and also a record of the voltage of the current; to the general arrangement of the apparatus whereby said recording instrument is actuated from or through the medium of the depth indicator so that the chart on which the record is made is moved simultaneously with, and proportional to, any movement of the rope or cable; and to a modified arrangement of the invention adapted to be actuated similar to or on the principle of an electric transformer.

Figure 9:
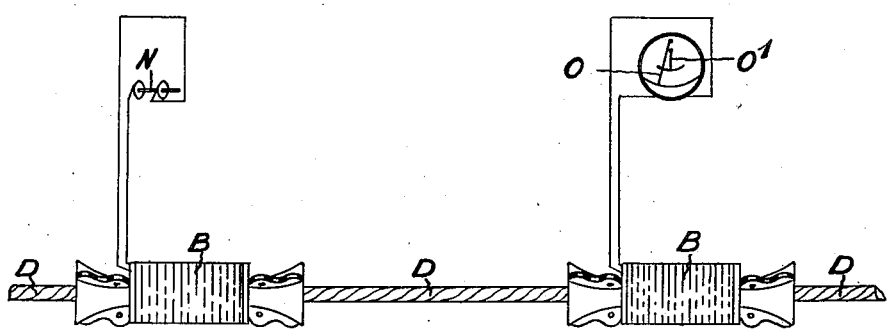
Figure 6:
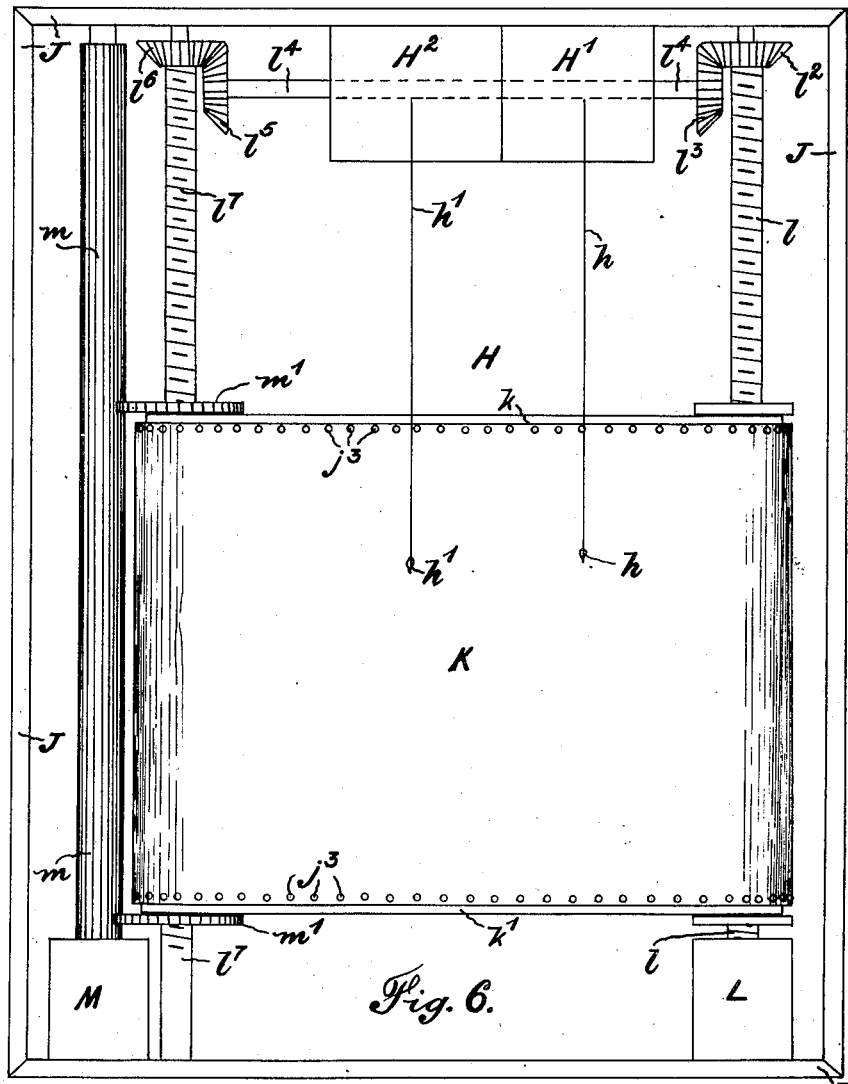
Figure 7:
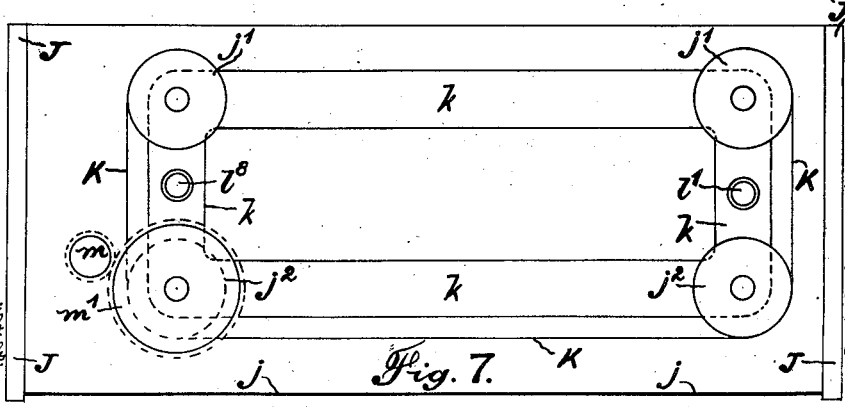

The invention will now be described in detail by aid of the accompanying drawings, wherein Figure 1 represents an elevation of the testing coil showing a portion of the wire rope passing therethrough, and also the indicating instrument. Fig. 2 is a longitudinal section of the coil. Fig. 3 is a transverse section of Fig. 2 on the line $x-x$. Fig. 4 is a detail view of the coil. Fig. 5 represents an end elevation of the testing coil and the means of suspending the same. Fig. 6 is an elevation of the recording instrument. Fig. 7 a plan of Fig. 6, Fig. 8 an elevation of the general arrangement of the hauling or hoisting gear in connection with which the apparatus is employed and showing the recording instrument drawn to an enlarged scale, and Fig. 9 is an elevation of the modified arrangement which is adapted to work on the transformer principle.

Referring more particularly to the arrangement shown in Figs. 1 to 4, A represents the spool or former which may be made of brass or any non-magnetic substance or material, round which is wound a coil B of insulated wire or conductor of a suitable gage, preferably compounded and taped to render it waterproof. The spool or former A has formed through it longitudinally a hole or passage $a$, which is of such a size as to leave a suitable amount of clearance between the interior walls and the rope E as the latter passes through it. The passage $a$ formed through the spool or former A is made flaring or bell-mouthed at the ends as shown at $a^1$ so that it will catch any broken strands or wires and deflect them through the spool A, thereby preventing damage to the rope. The spool or former A is shown provided with perforated lugs or projections C which serve for suspending or otherwise securing it in position as hereinafter explained, so that the rope may run freely through it.

In the construction shown the spool or former A is made in halves $a^2$ $a^3$ and on each half are formed lugs or projections in which are formed coincident holes adapted to receive a stud, set-screw, bolt or its equivalent $a^4$ (see Fig. 3) which serves for bolting the halves of the spool A together. With this construction the coil B is also severed along the plane of cleavage of the spool and the severed ends of the wires of one part of the spool are adapted to project into tubular pieces or sockets attached to the ends of the wires on the other part of the spool. This construction is shown in Fig. 4, in which $b$ represents the wire wound round one part of the former A, $b^1$ the wire wound round the other part of the former A, and $b^2$ the socket or tubular piece attached either to $b$ or $b^1$ and into which the other and unattached wire projects when the two parts $a^2$ $a^3$ of the coil are fitted together. Any other suitable means may be provided so long as suitable connection is made between the ends of the wires of the coil to permit the current to flow through it. Between the halves of the former A is placed insulating material represented at $a^5$. By this construction it is possible to clamp the testing coil B round the rope D instead of passing the end of the rope through it.

$b^3$ represents the terminals to which are attached the wires $b^4$, and $c$ represents the source of supply of electric energy, which as previously stated may be either an interrupted or an alternating current.

In the arrangement represented in Fig. 1, we employ an indicating instrument represented at E. This instrument is interposed in the electric circuit. The instrument is graduated as indicated at $e$ to indicate the voltage of the current. $e^1$ represents the pointer which works over said graduated scale $e$, and $e^2$ is another scale which is marked with decimals of an inch for indicating the variations in the cross sectional area of the rope to be tested, and $e^3$ represents the pointer working over said scale $e^2$. This instrument may be constructed like an ordinary milliamperemeter or be of any other suitable construction. The gage of the insulated wire and the number of times it is coiled round the former or spool A are varied to suit the size of the rope to be tested and the design of the recording instrument E.

Referring to the means of suspending or supporting the testing coil shown in Fig. 5, A represents the spool or former of the testing coil B, which as previously described is constructed at each end with the three perforated lugs C. To these lugs C are attached the three coiled springs $c^1$, which latter at their other extremities are attached to a triangular frame $B^1$. A similar frame and springs are provided for the other end of the spool A. The triangular frames $B^1$ may be rigidly connected in any suitable manner. In some cases the frames $B^1$ may be dispensed with and the outer ends of the coiled springs $c^1$ be attached to any convenient part of the timbers of the headgear. This means of suspension allows the testing coil B to yield to or follow the play or swing of the rope without undue wear. The coil may be suspended either by means of two of the frames $B^1$ or otherwise, in such a position, say in close proximity to the headgear sheave as seen at B in Fig. 8, that there is a minimum of vibration.

In Figs. 6, 7 and 8, we show the apparatus designed to work in conjunction with a recording instrument. In this construction F represents the headgear of a mine or the like and $f$ the headgear pulley or sheave round which the hauling rope D passes to the winding drum $f^1$ of the hauling engine. $f^2$ represents the hauling engine, of which $f^3$ represents the piston rod and $f^4$ the connecting rod driving the drum $f^1$. $f^5$ represents the lever actuating the reversing gear of the engine and G the indicator geared from the winding drum which serves for indicating at any time to the engine driver the position of the skip in the shaft of the mine.

In Fig. 8 the testing coil is shown at B in position for the hauling rope D to pass through it as it passes over the pulley sheave $f$, the suspension previously described not being shown so as to obviate obscuring the other parts.

$c$ represents the source of supply of electric energy which may be either an interrupted or alternating current. $b^4$ represents the wires placing the testing coil in series with the indicating instrument, the indicator G and reversing gear.

The recording instrument H, shown in connection with Fig. 8 and drawn to an enlarged scale compared with the other parts of the figure, and also illustrated to a still further increased scale in Figs. 6 and 7, consists of an instrument $H^1$ which works on the principle of an ammeter and has its pen or pointer indicated at $h$ moved by the current flowing through it in series with the testing coil B, and a voltmeter represented at $H^2$ actuating a recording pen $h^1$ simultaneously with the recording pen $h$ of the ammeter $H^1$, to enable any errors in the record made by the ammeter due to fluctuations in the pressure of the current, to be corrected. The ammeter $H^1$ and voltmeter $H^2$ are arranged in the upper portion of a rectangular casing J and their pens $h$ $h^1$ are arranged to record on a chart or reel of paper K which is adapted to move vertically inside the casing to indicate the condition of the rope D by means of the ammeter $H^1$ and also to be moved horizontally so as to separate the different trips or ascents and descents of the skip or cage in he shaft or to indicate the reversal of the direction of travel of the rope D through the testing coil. This is preferably effected by or through the medium of the reversing gear. The vertical travel of the chart K represents to scale the total travel of the hauling rope D in the shaft, and the vertical motion of said chart K being imparted by impulses of current sent through a make and break contact actuated by the indicator G, maintains the chart or paper K in relation to the pen $h$ at the same relative position as the rope D to the testing coil B. Under normal conditions, that is to say assuming the voltage or pressure to be constant and the rope to be of uniform cross sectional area, then the two pens $h\ h^1$ would make two parallel vertical lines on the chart K from top to bottom, representing a complete trip down the shaft. The reversal of the engine by means of the reversing gear then imparting through a suitable make and break contact a horizontal movement of the chart K, and the indicator G simultaneously reversing the direction of travel of the rope D, would, given the same conditions, cause the two pointers $h\ h^1$ to mark two parallel vertical lines on the chart from the bottom to the top. In the event of any variation in the pressure or voltage of the current this would be indicated by the pen $h^1$ of the voltmeter $H^2$, and producing a corresponding effect on the ammeter $H^1$, would enable the reading of the ammeter $H^1$ to be correspondingly corrected. Assuming the voltage or pressure to remain constant, then any reduction in the cross sectional area of the rope D would be indicated by the line made by the pen $h$ of the ammeter $H^1$ deviating from the vertical.

The recording instrument in so far as it embodies features of the present invention, is illustrated in Figs. 6, 7, and 8. The containing case J is preferably fitted with a sheet of glass or other transparent material $j$ at the front. The recording instrument comprises a top and bottom rectangular frame $k\ k^1$, which revolubly carry four rollers $j^1\ j^2$, round which passes the reel of paper K constituting the chart. The rollers $j^1\ j^2$ are free to rotate in their bearings in these frames $k\ k^1$. One of the back rollers $j^1$ carries the reel of paper K which passes round the two front rollers $j^2$ and winds on the other back roller $j^1$, as shown in Fig. 7. One or more of the rollers $j^1$, $j^2$ may at the top or bottom, or at both top and bottom, be provided with projecting pins which would enter holes $j^3$ in the paper to keep it taut for the recording pens $h\ h^1$, and also to insure its being properly fed forward on the rotation of the rollers $j^1\ j^2$.

For the purpose of effecting the vertical movement of the chart K, I employ a clockwork mechanism of a suitable construction arranged within a suitable casing represented at L. The escape of this clockwork or mechanism is worked by suitable electro-magnetic device actuated by make and break mechanism operated from or through the medium of the depth indicator G of the engine (see Fig. 8). The mechanism drives a vertically disposed screw-threaded spindle $l$ which works through screw-threaded holes $l^1$ in the rectangular frames $k\ k^1$. On the upper end of this screw-threaded spindle $l$ is fixed a bevel wheel $l^2$ which gears with the bevel wheel $l^3$ on one end of a horizontally disposed spindle $l^4$ on the other end of which is fixed another bevel wheel $l^5$. This latter bevel wheel gears with another bevel wheel $l^6$ fixed to the top of another vertical and parallel screw-threaded spindle $l^7$, which works through screw-threaded holes $l^8$ formed in the opposite ends of the rectangular frames $k\ k^1$. By providing the two screw-threaded spindles $l\ l^7$ and gearing them together in the manner described, it insures both ends of the frames $k\ k^1$ being positively and synchronously raised and lowered.

To effect the horizontal movement of the chart K we provide another clockwork mechanism located in a suitably disposed casing M. This clockwork has its escapement worked by suitable electro-magnetic device actuated by make and break mechanism under the control of the reversing gear, see Fig. 8. This mechanism drives a long pinion or toothed spindle $m$ which is vertically disposed inside the casing J. On the ends of one of the rollers $j^2$ are fixed two pinions or toothed wheels $m^1$ which mesh or gear with the toothed spindle $m$, as shown in Figs. 6 and 7. Each reversal of the engine imparts through the toothed spindle $m$ rotary motion to the roller $j^2$ to which are fixed the two pinions $m^1$, and so advances the paper or chart K, irrespective of the position of the latter, at each reversal. The chart K being moved simultaneously with, and proportional to, the movement of the rope D, enables the length or levels of the different trips to be ascertained, and thus the exact number of lifts, hauls or winds is recorded.

In the modification illustrated in Fig. 9 and designed to operate on the principle of the transformer, two of the testing coils B are employed. The electric current is passed through the one coil from the generator N or source of supply. The rope D in its passage through the two coils B serving as the core, the ordinary transformer effect is produced, and the record made by the indicator or ammeter O and voltmeter $O^1$ through the other coil.

What we claim as our invention and desire to protect by Letters Patent is:—

1. In apparatus of the nature specified, a testing coil constructed in halves, means for making electrical connection between the ends of the wires of the coil and means for clamping the halves together round the article to be tested.

2. In apparatus of the nature indicated, the combination with the testing coil slit longitudinally of nonconducting material placed in said slit, and an instrument for recording variations in the electrical current passing through the coil, caused by variations in the cross sectional area of the article being tested, by elctro-magnetic induction, substantially as described.

3. In apparatus of the nature indicated, the combination with the testing coil formed in halves longitudinally, insulating material placed between the halves, means for making electrical connection between the ends of the wires of the coil, means for connecting the halves of the coil to clamp it round the article to be tested, and an instrument for indicating variations in the current passing through the coil owing to variations in the cross sectional area of the article being tested, by electro-magnetic induction.

4. Apparatus of the nature indicated comprising an electro-magnetic coil through which the article to be tested is caused to pass, an instrument for recording variations in the current passing through the coil, caused by variations in the cross sectional area of the article being tested, by electro-magnetic induction, and an instrument for recording any variations in the voltage of the current passing through the coil.

5. In apparatus of the nature indicated, the combination with a tubular electro-magnetic coil through which the article to be tested is caused to pass, of means for yieldingly supporting the coil round the article to be tested, and means for producing a current in said coil.

6. In apparatus of the nature indicated, the combination with the electro-magnetic coil through which the article to be tested is caused to pass, said testing coil being constructed in halves longitudinally and formed at each end with perforated lugs, of means for yieldingly supporting the coil round the article to be tested, said means comprising a plurality of spiral springs attached at one end to said perforated lugs and at the other end to fixed points.

7. In apparatus of the nature indicated, the combination, with the reversing gear of an engine, of a depth indicator, a testing coil, a rope passing therethrough, an instrument for recording variations in the current passing through the coil owing to the variations in the cross sectional area of the rope, said means being operated through the medium of the depth indicator, means for recording variations in the voltage of the current, and means actuated through said reversing gear of the engine for moving the chart of the recording instrument to separate the hauls, lifts, or winds, substantially as described.

In witness whereof we have hereunto set our hands in the presence of two subscribing witnesses.

CHARLES EDWARD STUART McCANN.
RICHARD COLSON.

Witnesses to the signature of Charles Edward Stuart McCann:
CHAS. OVENDALE,
R. OVENDALE.

Witnesses to the signature of Richard Colson:
GEO. BURRIDGE,
A. GOLDSTEIN.